(12) United States Patent
Vettese (10) Patent No.: US 8,206,110 B2
(45) Date of Patent: Jun. 26, 2012

(54) HORIZONTAL WIND TURBINE BLADE BALANCING ACCESSORY

(76) Inventor: Sharolyn Vettese, North York (CA)

( * ) Notice: Subject to any disclaimer, the term of this patent is extended or adjusted under 35 U.S.C. 154(b) by 653 days.

(21) Appl. No.: 12/358,451

(22) Filed: Jan. 23, 2009

(65) Prior Publication Data

US 2010/0189561 A1    Jul. 29, 2010

(51) Int. Cl.
 *B63H 3/06* (2006.01)
 *F03D 9/00* (2006.01)
 *B21D 53/78* (2006.01)
(52) U.S. Cl. ............................ 416/144; 290/55; 29/889.7
(58) Field of Classification Search .................. 416/144, 416/5, 19, 117, 118; 290/889, 889.6, 889.7, 290/55, 44, 1 B; 29/889, 889.6, 889.7
 See application file for complete search history.

(56) References Cited

U.S. PATENT DOCUMENTS

| 4,291,235 A * | 9/1981 | Bergey et al. ................... 290/55 |
| 5,219,454 A * | 6/1993 | Class ............................ 416/145 |
| 7,186,083 B2 * | 3/2007 | Bayly ............................. 416/51 |

\* cited by examiner

*Primary Examiner* — Thomas L Dickey
*Assistant Examiner* — Nikolay Yushin
(74) *Attorney, Agent, or Firm* — Shoemaker and Mattare (57) ABSTRACT

A balancing assembly for use in a wind turbine having at least one pair set of blades, the balancing assembly comprising a ballast and a ballast receiving structure on at least one blade of the pair set of blades. The ballast provides a threaded portion for engagement with the ballast receiving structure. The ballast further provides at least one end configured with a drive socket for driving said ballast into said ballast receiving structure. The ballast is capable of being trimmed to achieve a predetermined mass necessary to achieve a balance between the blades in the pair set of blades.

10 Claims, 10 Drawing Sheets

HORIZONTAL WIND TURBINE BLADE BALANCING ACCESSORY

FIELD

The present specification relates to wind turbines, in particular to a rotating system balancing assembly for establishing correct balance in the configuration of blades on a blade assembly.

BACKGROUND

With the current awareness of global warming and the human impact upon the environment, there is an increasing shift towards greener, ecologically-friendly technologies. While fossil fuel-fired and nuclear power plants have been standard methods of power generation for the last century, alternative methods for power generation, particularly from renewable energy sources such as the sun and wind have been attracting increasing attention from industry, governments and the general public.

Modern windmills for power generation, or wind turbines, are growing in popularity, with wind farms being established in many countries around the world. Modern windmills come in a variety of sizes and configurations, but many people associate them with the large horizontal wind turbines used for large scale energy generation. These large turbines can stand as tall as 90 meters, with generally three equidistantly spaced blades measuring upwards of 30 meters each. As more of these three-bladed wind turbines, large and small, are being installed, there have been complaints about the electromagnetic resonance being emitted from them, generally attributed to the imbalance of the wind blades.

At the same time, there is growing interest for smaller turbine units (e.g. 3 kW to 99 kW) that are better suited to urban and residential application. In general, when wind turbines operate at low rotational velocities, imbalances become more pronounced. The resulting electromagnetic resonance and white noise levels become irritants to those living in the vicinity of wind turbines. As a result, these factors have been a source of contention among opponents and supporters of renewable energy. Addressing these factors will facilitate the development of this important market so that electricity will be generated on-site close to the electricity users. In addition, it is important that the blades used for wind capture are accurately balanced, so as to avoid potentially destructive vibration in the turbine unit.

SUMMARY

According to an aspect of an embodiment, in a wind turbine having at least one pair set of blades, a balancing assembly comprising a ballast and a ballast receiving structure on at least one blade of the pair set of blades. The ballast has a threaded portion for engagement with the ballast receiving structure, the ballast also having at least one end configured with a drive socket for inserting the ballast into the ballast receiving structure. The ballast is capable of being selected, and if necessary, trimmed to achieve a predetermined mass necessary to achieve a balance between the blades in the pair set of blades.

In some embodiments of the balancing assembly, the ballast receiving structure is a stem provided on the blade.

In some embodiments of the balancing assembly the ballast receiving structure provides a receptacle for receiving the ballast, the receptacle being located on an end face of the ballast receiving structure, in general alignment with the longitudinal axis of the blade.

In some embodiments of the balancing assembly, at least one end of the ballast is further provided with a head configured to abut an end face of the ballast receiving structure on the blade.

In some embodiments of the balancing assembly, the ballast receiving structure comprises a mounting block capable of being mounted on the blade, the mounting block being configured with a receptacle for receiving the ballast.

In some embodiments of the balancing assembly, the mounting block is mounted having the receptacle in general alignment with the longitudinal axis of the blade.

In some embodiments of the balancing assembly, the mounting block is mounted having the receptacle generally perpendicular to the longitudinal axis of the blade.

In some embodiments of the balancing assembly, the mounting block is provided within a shaped housing or sheathing to enhance the wind dynamics around the mounting block.

In some embodiments of the balancing assembly, the mounting block is shaped to enhance the wind dynamics around the mounting block.

In some embodiments where the ballast is provided with a head, the balancing assembly further comprises at least one ballast disk for placement on the threaded portion of the ballast, between the head and the end face of the ballast receiving structure, wherein at least one ballast disk is retained in position upon tightening of the ballast into the ballast receiving structure.

In some embodiments of the balancing assembly, the ballast receiving structure is located in the vicinity of a tip portion of the blade.

According to another aspect of an embodiment, provided is a method of balancing blades in a pair set of blades used in a wind turbine. The method comprises determining the mass of each blade in the pair set of blades and identifying the blade with reduced mass, and determining the noted difference in mass. A rotating system balancer having a mass greater than the noted difference in mass is selected, and trimmed to match the noted difference in mass. The rotating system balancer is affixed to the blade identified with the reduced mass, the rotating system balancer being provided with a threaded portion for engagement with a corresponding receiving structure of the blade.

BRIEF DESCRIPTION OF THE DRAWINGS

Embodiments of the present application will now be described, by way of example only, with reference to the attached Figures, wherein.

DESCRIPTION OF THE EMBODIMENTS

The rotating system balancing assembly described below is suitable for use in reducing vibrations and low/high frequency sounds on a wide range of wind turbines, such as the horizontal dual-rotor wind turbine described in applicants co-pending U.S. application "ROTOR DRUM" filed Apr. 13, 2007, which is herein incorporated by reference.

Figure 1:
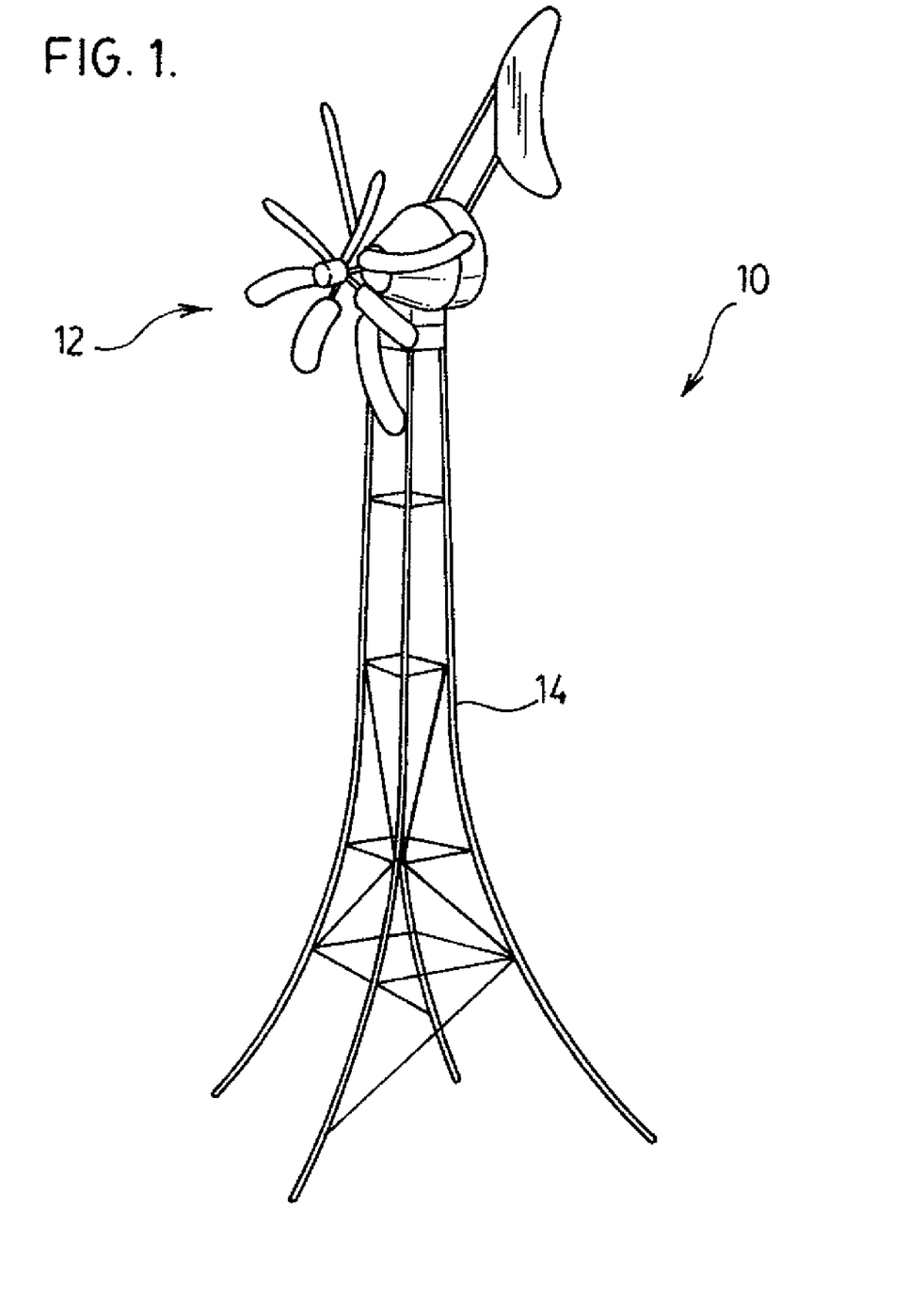
FIG. 1 is a perspective view of an exemplary wind turbine.

Referring now to FIG. 1, shown for exemplary purpose is a horizontal dual-rotor wind turbine, indicated by reference numeral 10. The dual rotor wind turbine 10 generally comprises a wind assembly 12 rotatably mounted on a tower 14.

Figure 2:
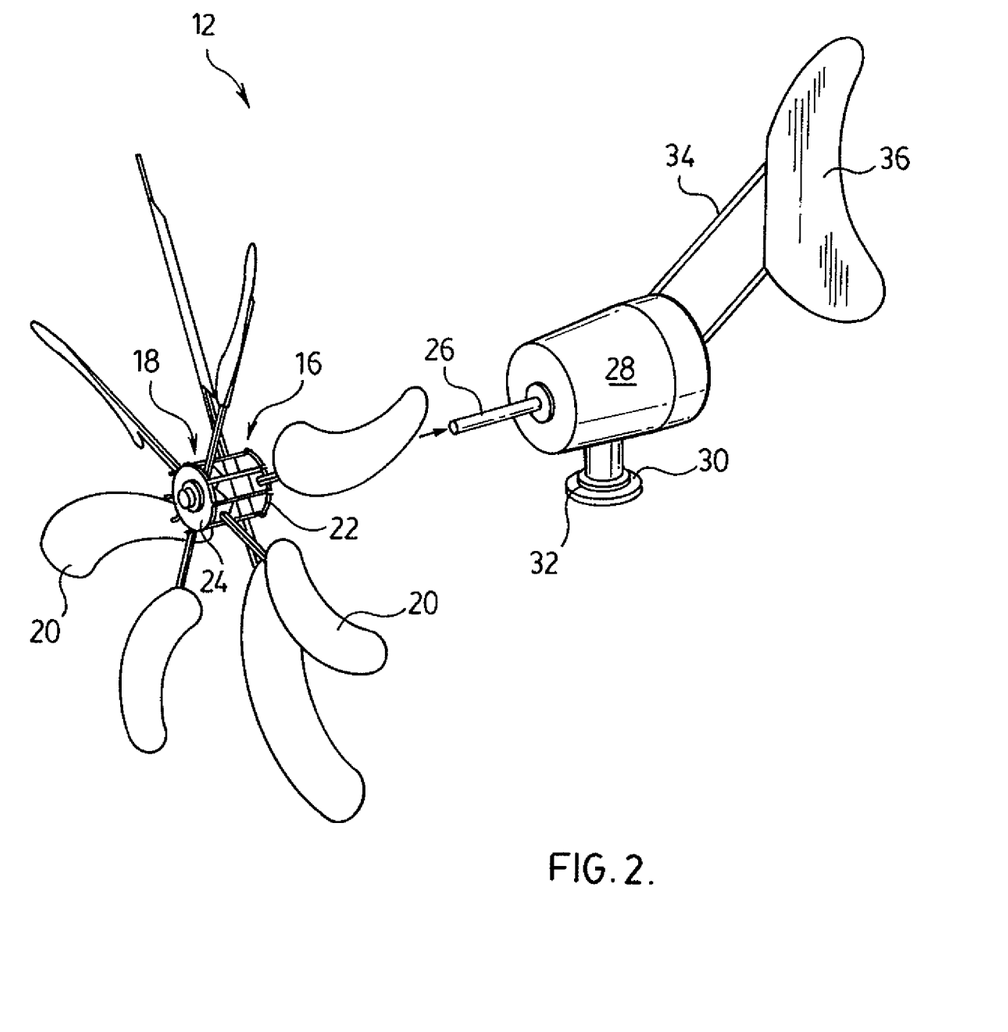
FIG. 2 is a perspective view of the wind assembly of the exemplary wind turbine of FIG. 1.

The wind assembly 12 generally comprises a rotor assembly having arranged thereon a plurality of equidistantly spaced-apart blades. In the example shown in FIG. 2, a dual rotor assembly is provided comprising a primary rotor assembly 16 and an auxiliary rotor assembly 18, each rotor assembly having mounted thereon a plurality of blades 20, the blades being circumferentially equidistantly spaced on respective rotors 22, 24. As shown, both the primary rotor assembly 16 and the auxiliary rotor assembly 18 comprise four blades each, and both assemblies work cooperatively to rotate a common generator shaft 26 from a generator 28 affixed to a rotatable tower hub 30 (generator shown detached from rotor assemblies for clarity). To enable the wind assembly 12 to rotate relative to the tower 14, and in particular towards the incurrent air (upwind orientation), the tower hub 30 is provided with a rotatable yaw bearing surface 32. Rotation of the wind assembly 12 about tower hub 30 is facilitated by a tail assembly mounted downwind of the wind assembly, the tail assembly generally comprising a tail boom 34 and vane 36.

Figure 3:
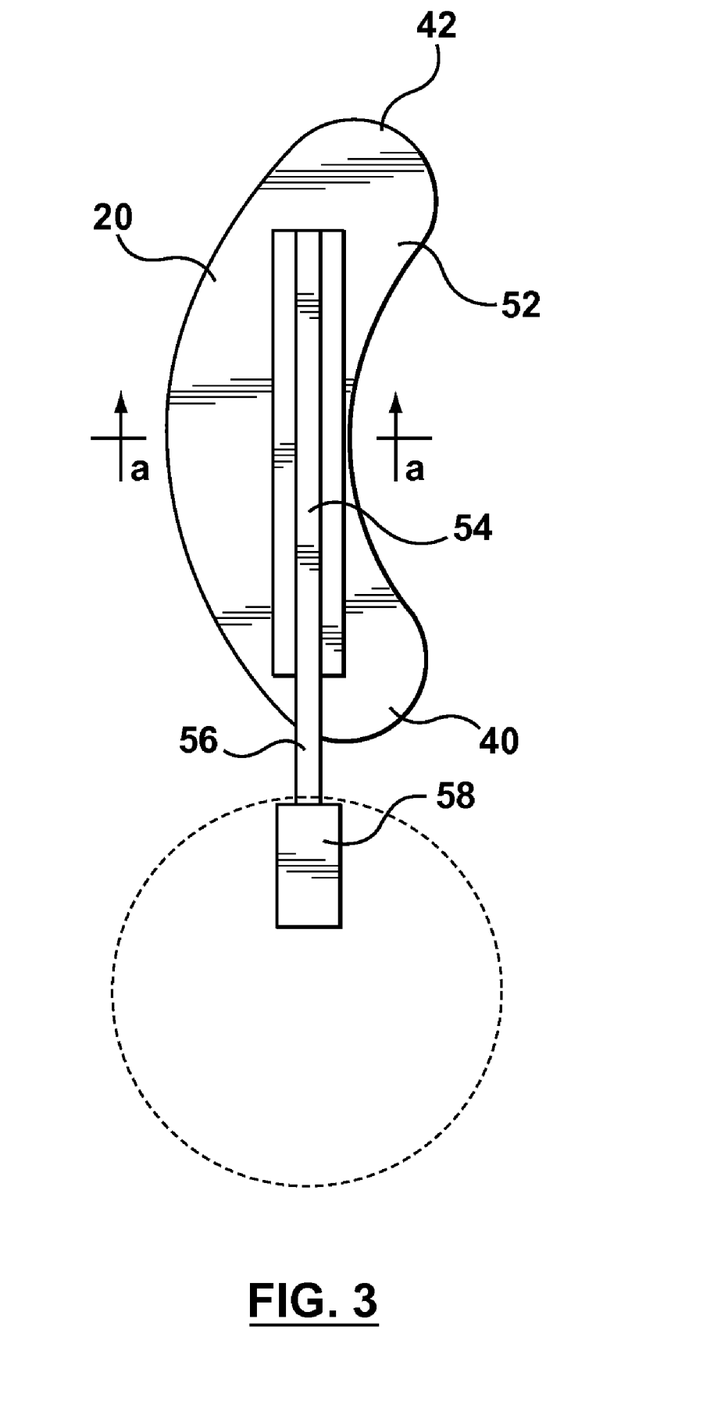
FIG. 3 is a rear view of a blade assembly.

In the wind assembly shown in FIG. 3, the leeward side 52 of the blade 20 is supported by a suitable stem 54 that generally spans the blade 20 from the tip portion 42 through to the counter-tip portion 40. The stem 54 is affixed to the blade 20 using suitable rivets, but other fastening systems including, but not limited to threaded fasteners and welds are also possible. An extension portion 56 of the stem 54 extends past the counter-tip portion 40 so as to fixedly engage the respective rotor.

Figure 4:
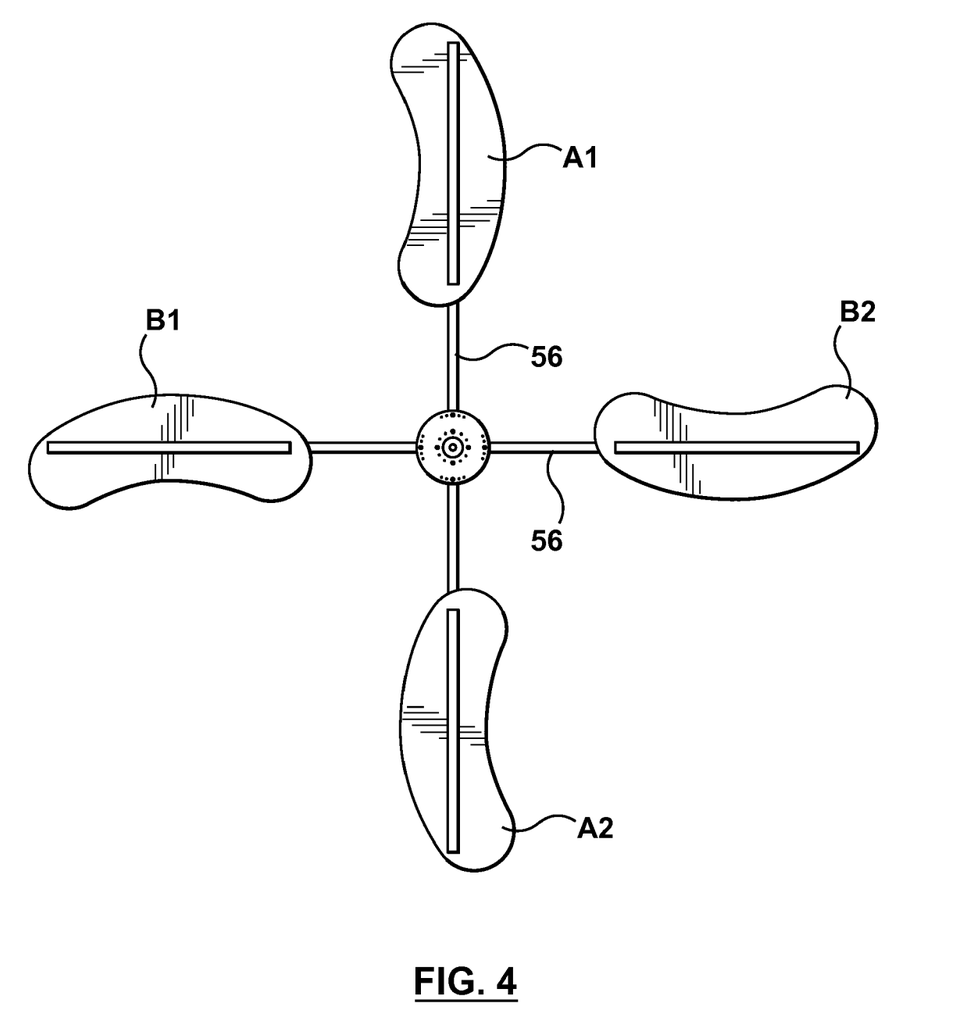
FIG. 4 shows an exemplary blade configuration having two pair sets of blades.

In the above embodiment, each rotor assembly is comprised of 4 blades. The blades of each rotor assembly are arranged as pair sets, for example set A1-A2, and B1-B2, as shown in FIG. 4. In order to reduce vibration during rotation, particularly at operational rotational velocities, each blade in a pair set must be balanced relative to each other. For example, blade A1 must be balanced with respect to blade A2. Blades B1 and B2 must also be balanced.

Figure 5:
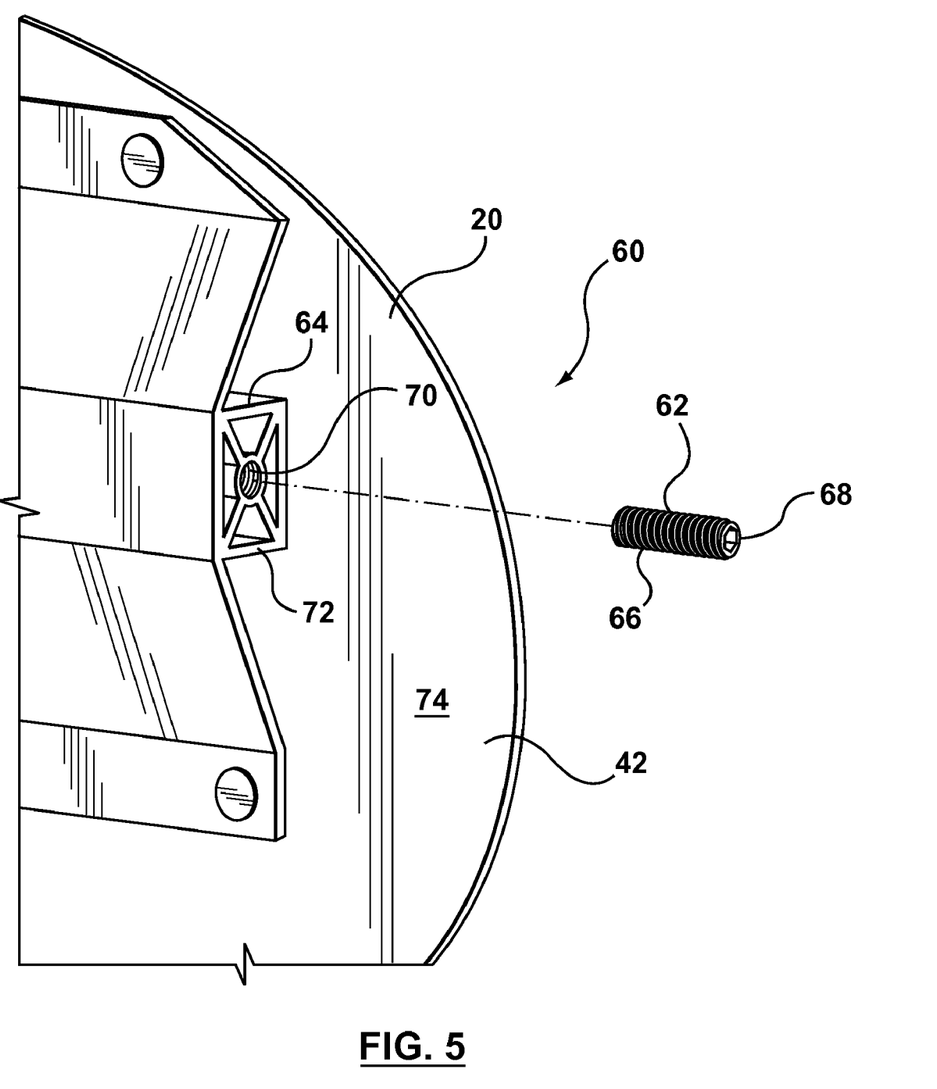
FIG. 5 presents one embodiment of a rotating system balancer being inserted into the blade stem.

Shown in FIG. 5 is a rotating system balancing assembly 60 suitable for use in balancing the aforementioned blades. The rotating system balancing assembly 60 generally comprises a threaded ballast 62 and a corresponding ballast receiving structure 64. The threaded ballast 62 generally comprises a threaded shaft 66 and a suitable drive socket 68 provided on at least one end. A non-limiting example of suitable drive sockets includes hex-socket, TORX, spanner head, spline drive and double hex. Other suitable drive sockets are known and may be suitable implemented. The ballast 62 is configured to threadedly fit within a corresponding receptacle 70 provided on the ballast receiving structure 64. As shown in FIG. 5, the receptacle 70 is provided on an end face 72 of the ballast receiving structure 64, which in this case is the stem 54 affixed to the rear side 74 of the blade 20. It will be appreciated that the receptacle 70 may be provided on an alternate face of the ballast receiving structure 64, for example the side face. It will also be appreciated that while the receptacle is shown in general alignment with the longitudinal axis of the blade, the receptacle may be aligned generally perpendicular to the longitudinal axis of the blade, or at any angle there-between. Regardless of the orientation of the receptacle relative to the axis of the blade, the intent is the secure addition of ballast to the blade assembly to account for the measured imbalance with respect to each blade within a pair set of blades.

To balance a pair set, each blade in the pair set is weighed, and the difference in mass with respect to each blade in the pair set is determined. The ballast 62 of the rotating system balancing assembly 60 is then trimmed to an appropriate length to match the mass to be added to the deficient blade. In other words, the rotating system balancing assembly 60, in particular the ballast 62 is customized in accordance with the mass required to establish a balance between blades in a pair set. With the ballast 62 trimmed to the appropriate length, the ballast 62 is threadedly inserted into the receptacle 70 of the corresponding ballast receiving structure 64 on the mass-deficient blade, as shown in FIG. 5.

Figure 6A:
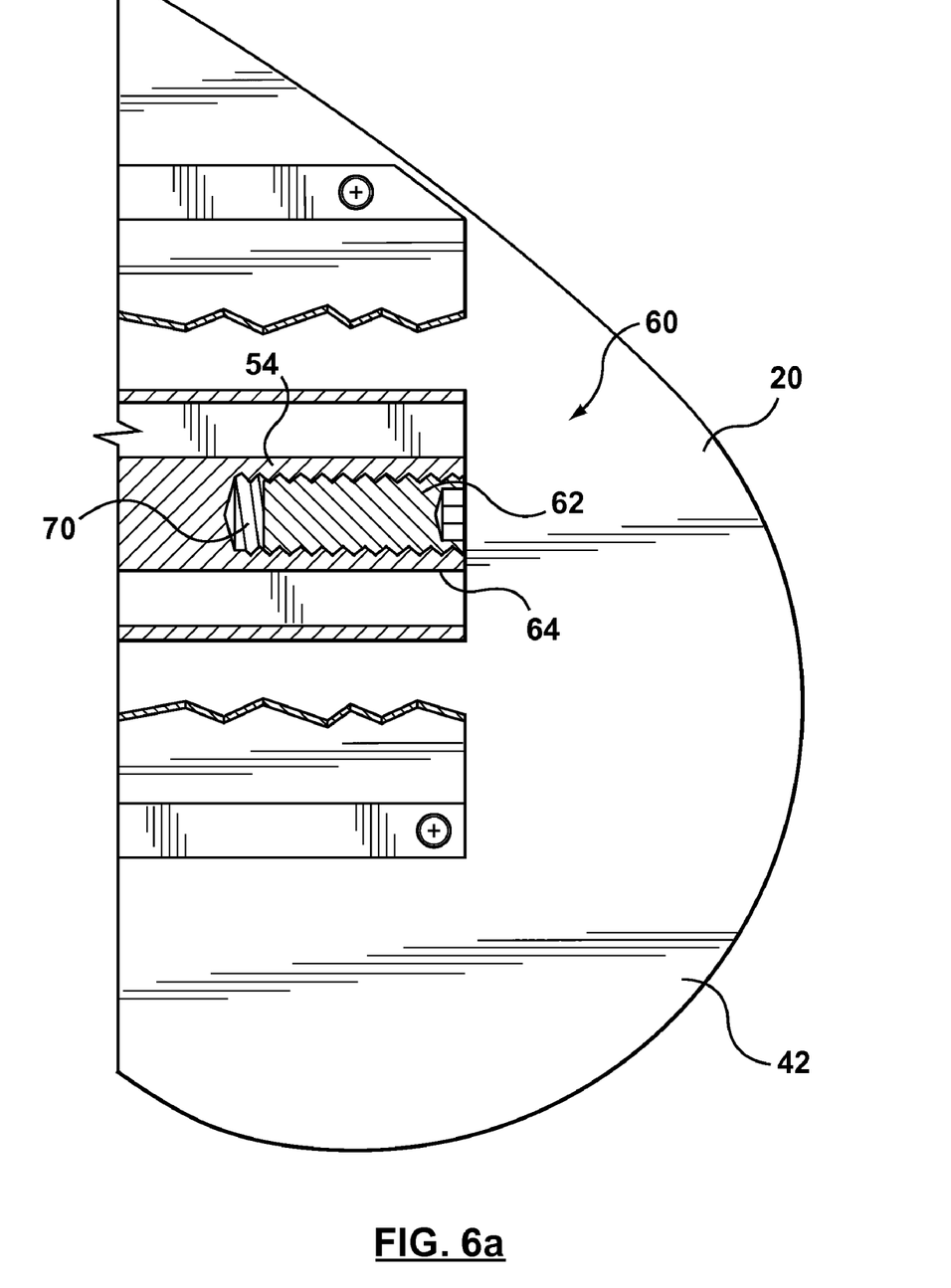
FIG. 6a is a sectional view of the blade stem showing the rotating system balancer of FIG. 5 threaded into position.
Figure 6B:
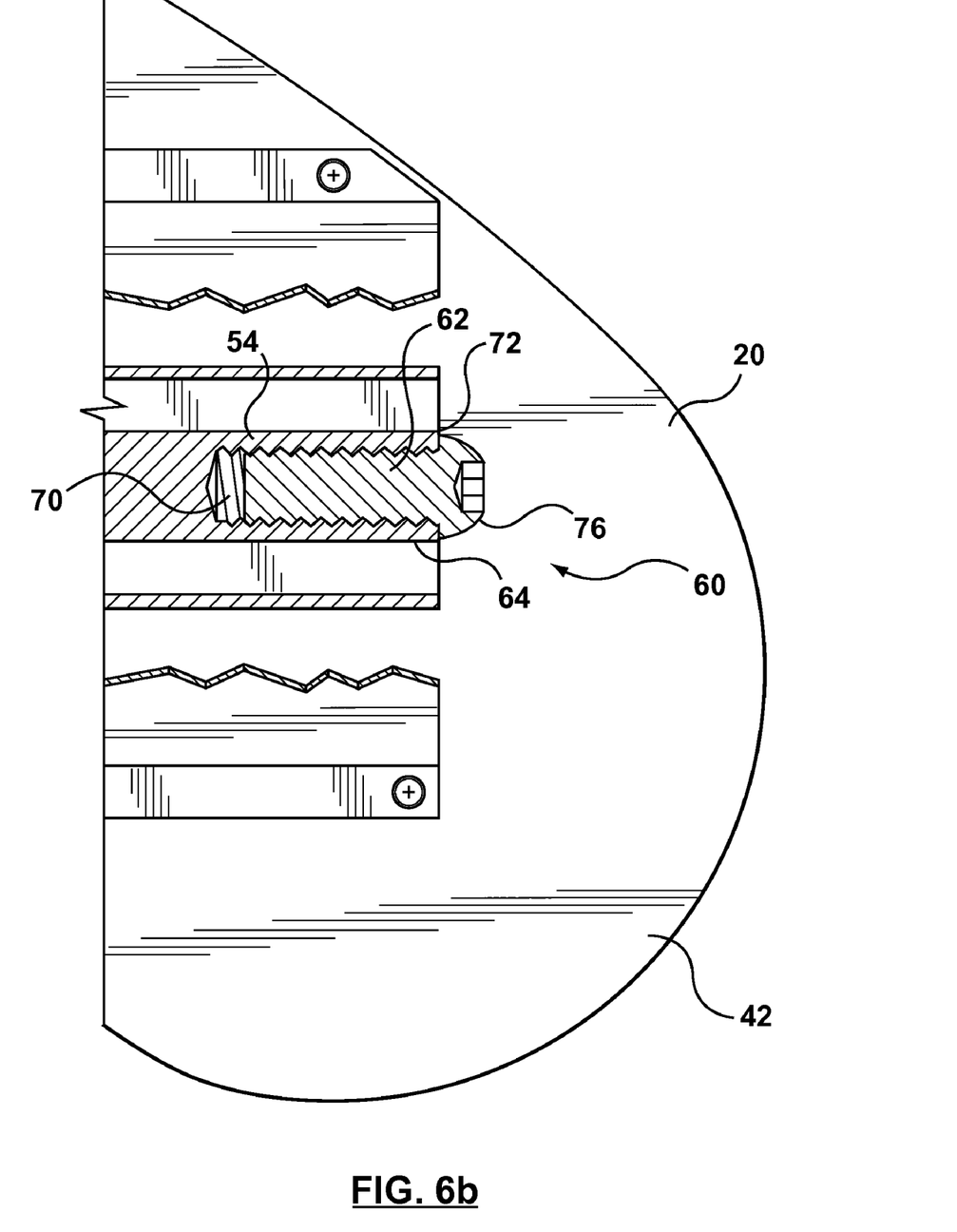
FIG. 6b is a sectional view of the blade stem showing an alternate embodiment of the rotating system balancer.

In FIG. 6a, a first embodiment of a rotating system balancing assembly 60 is shown, wherein the ballast 62 can be threaded entirely into the ballast receiving structure 64 of the blade assembly. In this way, the ballast 62 is hidden and protected within the ballast receiving structure 64 (e.g. the stem 54). In an alternate embodiment as shown in FIG. 6b, the ballast 62 is provided with a head 76 that abuts against the outside surface of the ballast receiving structure 64 (e.g. the end face 72 of the stem 54). For the purposes of establishing more optimal wind dynamics, the head 76 of the ballast 62 may be rounded, as shown.

Figure 7A:
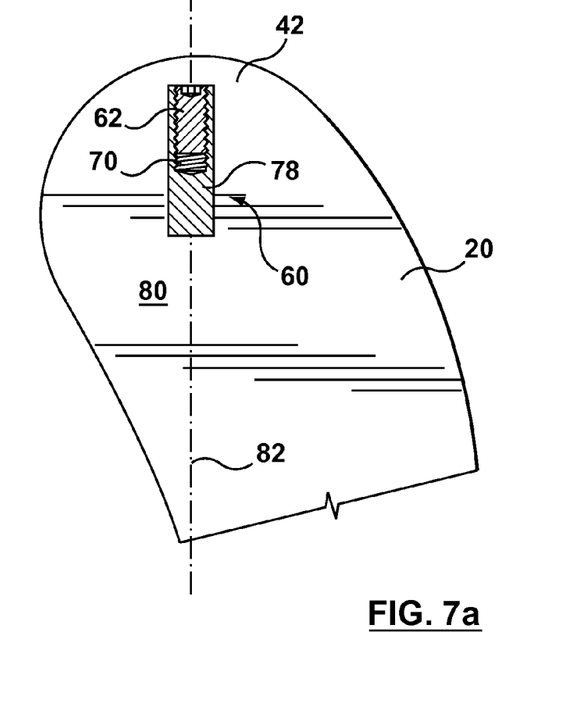
FIG. 7a is a sectional view of a first embodiment of a mounting block located on the rear of a blade, the mounting block having the rotating system balancer of FIG. 5 threaded into position.
Figure 7B:
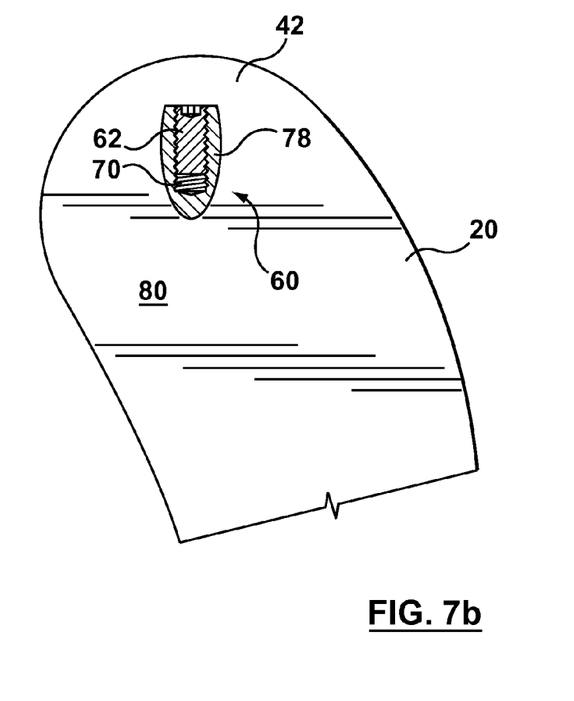
FIG. 7b is a sectional view of a second embodiment of a mounting block located on the rear of a blade, the mounting block having the rotating system balancer of FIG. 5 threaded into position.
Figure 7C:
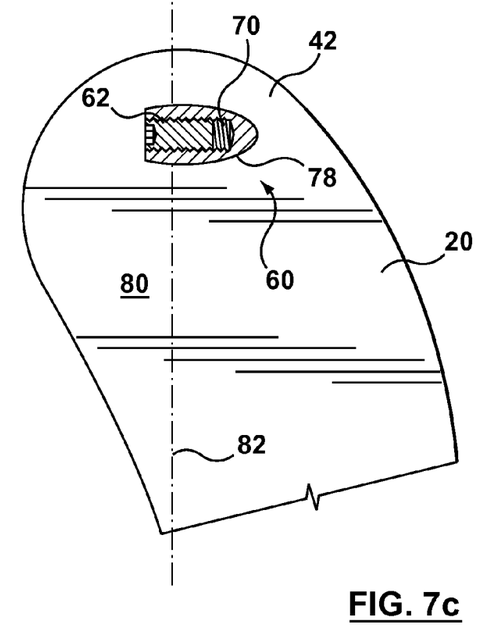
FIG. 7c is a sectional view of a third embodiment of a mounting block located on the rear of a blade, the mounting block having the rotating system balancer of FIG. 5 threaded into position.
Figure 7D:
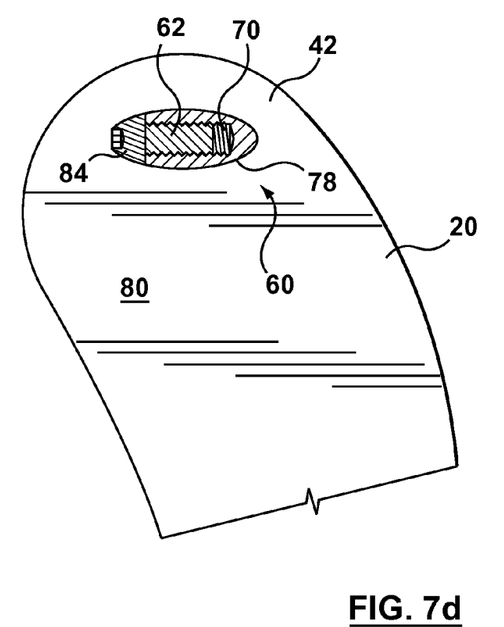
FIG. 7d is a sectional view of a forth embodiment of a mounting block located on the rear of a blade, the mounting block having the rotating system balancer of FIG. 5 threaded into position.
Figure 8A:
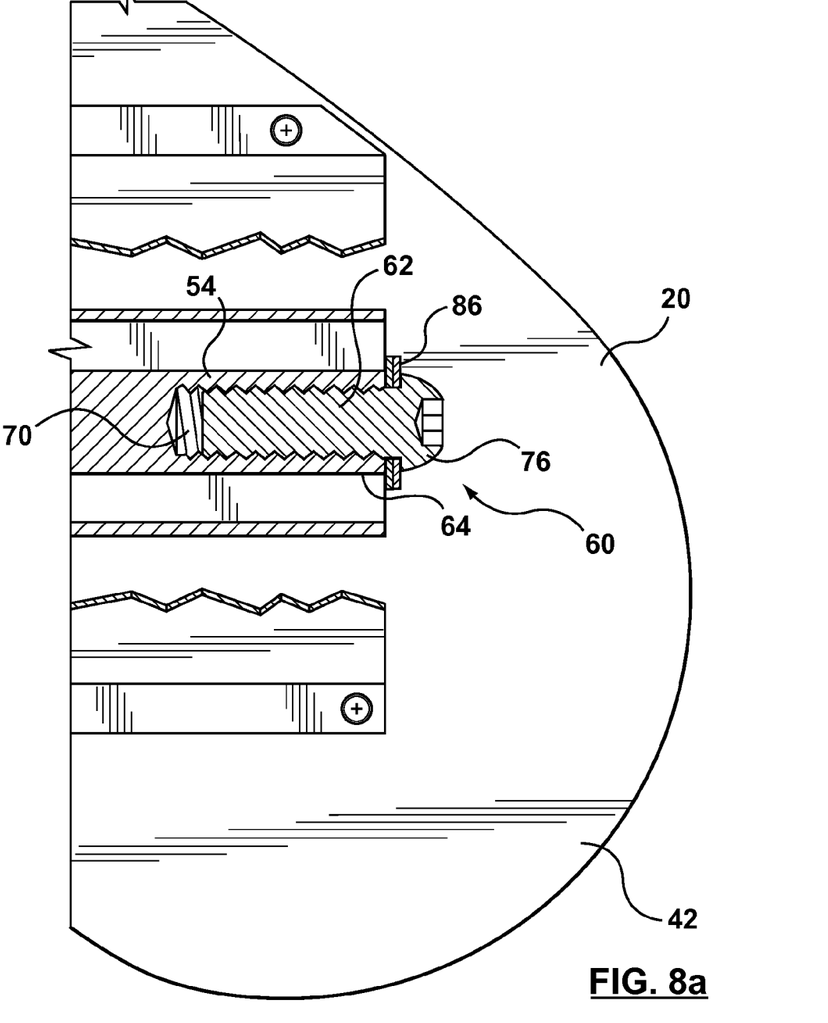
FIG. 8a is a sectional view of an alternate rotating system balancer in which the balancer comprises a head allowing for placement of disk ballasts to the balancer.
Figure 8B:
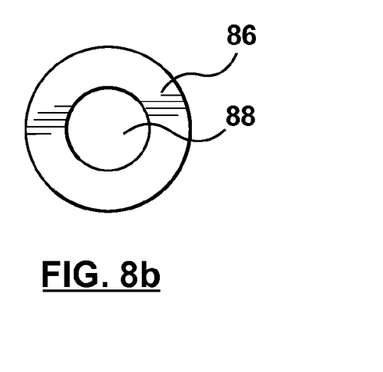
FIG. 8b is a first embodiment of a disk ballast.
Figure 8C:
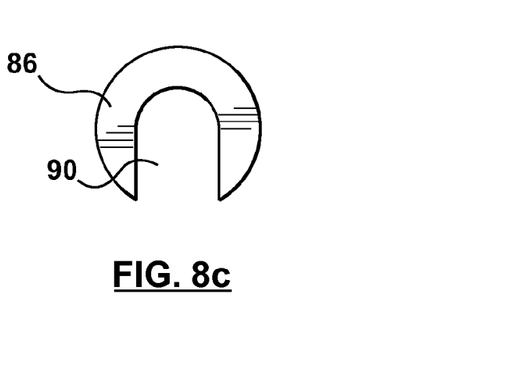
FIG. 8c is a second embodiment of a disk ballast.

In some embodiments, the threads provided on the threaded shaft 66 are complementary to threads provided on the receptacle 70 of the ballast receiving structure 64. In another embodiment, the threads on the threaded shaft 66 are self-tapping, permitting engagement with an unthreaded receptacle provided in the ballast receiving structure 64.

Where the blade assembly does not comprise a stem suitable for serving as a ballast receiving structure 64, the ballast receiving structure is provided in the form of a mounting block 78, as shown in FIG. 7a. The mounting block 78 is generally attached to the rear face 80 of the blade 20, providing the receptacle 70 for receiving the ballast 62 of the rotating system balancing assembly 60. For example, the mounting block 78 may be attached to the rear face 80 of the blade 20 in the vicinity of the tip portion 42, using suitable fasteners (e.g. bolts, screws, etc.). To promote more efficient wind dynamics, the mounting block 78 may be shaped (e.g. tapered, rounded, etc.), as shown in FIG. 7b. While shown with the mounting block 78 positioned generally parallel to the longitudinal axis 82 of the blade 20, the mounting block 78 may also be mounted perpendicular to the longitudinal axis 82, as shown in FIG. 7c. As shown in FIG. 7d, a detachable housing or sheathing 84 may also be used to cover or cap the mounting block 78 to further streamline the airflow, to reduce the impact of the presence of the mounting block on the rotational efficiency of the blade assembly.

Where the ballast 62 is provided with a head portion, the rotating system balancing assembly may additionally comprise one or more ballast disks 86, as shown in FIG. 8a. Ballast disks 86 can be provided in a range of weights and attached as necessary to the ballast 62 upon tightening against the ballast receiving structure 64. The disks 86 can be configured much like a washer as shown in FIG. 8b, with a central opening 88 that fits around the threaded shaft 66 of the ballast 62. Alternatively, the ballast disks 86 can be configured with a cutout portion 90 that permits the placement of the ballast disk 86 upon the threaded shaft 66 of the ballast 62 without having to completely unthread the ballast 62 from the ballast receiving structure 64, as shown in FIG. 8c. While firmly retained upon tightening of the ballast 62, the ballast disks 86 may be removed or supplemented with additional disks should later adjustments to the balance of the blades in the pair sets be necessary.

With small to medium sized wind turbines, which operate at higher rotational velocities compared to the larger megawatt turbines, a well balanced blade assembly serves to reduce the likelihood of vibration and associated emission of high and low frequency noise. In addition, a balanced blade assembly contributes to a more efficient operation, a slower start-up speed, and reduced maintenance requirements. The rotating system balancer described herein permits efficient balancing of the blade assembly, while also being fully adjustable in the event that later adjustments are necessary, for example after a blade has been replaced, or other maintenance operations necessitate re-balancing of the blades.

While described in the general framework of wind turbines, the rotating system balancer will find application in other devices comprising rotating mechanisms, including, but not limited to ceiling fans, exhaust and intake mine fans, and vertical wind turbines with the paddles or helixes.

It will be appreciated that while embodiments have been described and illustrated in detail, various modifications and changes may be made. It will be appreciated that some of the features described above can be modified, lengthened replaced or even omitted. For example, while the rotating system balancing assembly is described as having a single receptacle for receiving a ballast, the rotating system balancing assembly may be configured with more than one receptacle, to permit the mounting of more than one ballast, if necessary. Still further alternatives and modifications may occur to those skilled in the art. All such alternatives and modifications are believed to be within the scope of the invention.

The invention claimed is:

1. In a wind turbine having at least one pair set of blades, a balancing assembly comprising:
   a ballast;
   a ballast receiving structure on at least one blade of said pair set of blades; said ballast having a threaded portion for engagement with said ballast receiving structure,
   said ballast having at least one end configured with a drive socket for driving said ballast into said ballast receiving structure, said at least one end having a head configured to abut an end face of said ballast receiving structure; and
   at least one ballast disk for placement on said threaded portion, between said head and said end face, wherein said at least one ballast disk is retained in position upon tightening of said ballast into said ballast receiving structure;
   wherein said ballast is capable of being trimmed to achieve a predetermined mass necessary to achieve a balance between the blades in said pair set of blades.

2. The balancing assembly of claim 1, wherein said ballast receiving structure is a stem provided on said blade.

3. The balancing assembly of claim 1, wherein said ballast receiving structure provides a receptacle for receiving said ballast, said receptacle being located on an end face of said ballast receiving structure, in general alignment with the longitudinal axis of said blade.

4. The balancing assembly of claim 1, wherein said ballast receiving structure is located in the vicinity of a tip portion of said blade.

5. The balancing assembly of claim 1, wherein said ballast receiving structure comprises a mounting block capable of being mounted on said blade, said mounting block being configured with a receptacle for receiving said ballast.

6. The balancing assembly of claim 5, wherein said mounting block is mounted having said receptacle in general alignment with the longitudinal axis of said blade.

7. The balancing assembly of claim 5, wherein said mounting block is mounted having said receptacle generally perpendicular to the longitudinal axis of the blade.

8. The balancing assembly of claim 5, wherein said mounting block is provided within a shaped housing or sheathing to enhance the wind dynamics around said mounting block.

9. The balancing assembly of claim 5, wherein said mounting block is shaped to enhance the wind dynamics around said mounting block.

10. A method of balancing blades in a pair set of blades used in a wind turbine, the method comprising:
    determining the mass of each blade in the pair set of blades;
    identifying the blade with reduced mass and determining the noted difference in mass;
    selecting a ballast having a mass greater than said difference in mass; trimming said ballast to match said difference in mass;
    affixing said ballast to the blade identified with reduced mass;
    wherein said ballast is provided with a threaded portion for engagement with a corresponding ballast receiving structure provided on said blade.

* * * * *